United States Patent Office 3,509,018
Patented Apr. 28, 1970

3,509,018
CORD-TO-RUBBER ADHESION IMPROVEMENT BY THE ADDITION OF METHYLENE DONORS SUCH AS 1,3-DIMETHYLOL-2-IMIDAZOLIDININE
Richard Leshin, Akron, Charles N. Meier, Stow, and Norman G. Endter, Cuyahoga Falls, Ohio, assignors to The Goodyear Tire & Rubber Company, Akron, Ohio, a corporation of Ohio
No Drawing. Filed Jan. 21, 1965, Ser. No. 427,139
Int. Cl. B32b 25/02, 25/08
U.S. Cl. 161—241                              2 Claims

ABSTRACT OF THE DISCLOSURE

Discloses rubber and non-metallic reinforced rubber structures wherein the rubber is modified with a resin formed in situ from the reaction of a methylene acceptor such as resorcinol and a methylene donor reactable therewith. The donors are N-(substituted oxymethyl) derivatives of urea, N-(substituted oxymethyl) derivatives of imidazolidines, N-(substituted oxymethyl) derivatives of hydantoins, and N-(substituted oxymethyl) derivatives of melamines.

---

This invention relates to improvements in the method of adhering rubber to the surface of a reinforcing agent and particularly to those reinforcing agents made of regenerated cellulose, polyamides, polyesters and polycarbonates.

It is well known to use rubber in the manufacture of pressure hose, drive belts, and pneumatic tires, but when used in this manner it is necessary to reinforce the rubber with a textile material such as cotton, rayon, nylon, etc. Maximum reinforcement of the rubber is obtained when maximum adhesion is produced between the rubber and the reinforcing element. Cotton is easily adhered to rubber but the bonding of rayon is more difficult and nylon, polyester, and polycarbon are even more difficult to bond to rubber because of the relatively smooth condition of the surface of these reinforcing elements. This bonding problem is solved to a degree by the use of a resorcinol-formaldehyde-rubber latex (R/F/L) adhesive applied to the reinforcing element from a water solution. A bond is then formed between the R/F/L adhesive on the reinforcing element and the rubber after the rubber has been subjected to vulcanization temperatures.

With the advent of the polyester and polycarbonate fibers, it was necessary to develop a better adhesive system and attempts were made by adding resin forming reactants to the rubber which would react to form a resin in situ. However, it was soon observed that just any resin may not be used but only those resin in situ systems that do not destroy the desirable physical properties of the vulcanized rubber and of the reinforcing fiber especially after subjecting the rubber and the fiber to aging.

In working with nylon as the reinforcing agent, considerable promise was shown in producing a strong bond between the nylon and the rubber when the rubber was first compounded with resorcinol and hexamethylenetetramine. With the introduction of the polyester and polycarbonate cords as reinforcing elements for rubber, these adhesive systems were not functional under all conditions of use especially when used in pneumatic tires run at relatively high speeds. Other problems arise in connection with rayon and with nylon.

It has now been discovered that methylene donors, capable of generating methylene groups in the presence of a methylene acceptor to form a resin and nitrogenous compound, the compound being relatively inert toward the fiber will not only develop a satisfactory bond between the rubber and the fiber but also minimize degradation of the polyester and polycarbonate fiber to rubber laminate without interfering with the development of desirable physical properties in the rubber especially after the rubber has been subjected to heat aging.

The methylene donors that are used in forming the in situ resin in the rubber being bonded to the surface of the reinforcing agent contain at least one 3 valent nitrogen connected to at least one $CH_2$ radical (—$CH_2$—). The remaining valence of the $CH_2$ radical is connected to an oxy radical (—OX) wherein X is a radical selected from the group consisting of hydrogen to form a methylol group (—$CH_2OH$), or a lower alkyl (1–8C) to form an alkoxymethyl group (—$CH_2OR$). When one of the nitrogen valences are satisfied by the $CH_2$ radical at least one of the two remaining valences of the nitrogen is connected to a carbon atom and the remaining valence may be connected to a carbon atom or hydrogen.

The methylene donors of this invention may be further classified as N-(substituted oxymethyl) derivatives of urea, including N-(substituted oxymethyl) imidazolidines, and N-(substituted oxymethyl) hydantoins, as well as derivatives of N-(substituted oxymethyl) melamines. One class of urea derivatives has the general formula:

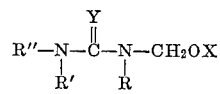

wherein Y is oxygen or sulfur, X is hydrogen or lower alkyl (1–8C) and R, R' and R" are hydrogen, lower alkyl (1–8C) or —$CH_2OX$, but not more than two —$CH_2OX$ groups may be present in the compound, and not more than one —$CH_2OX$ may be present on any one nitrogen atom. Examples of these ureas are 1,3-dimethylol thiourea, 1,3-dimethylol urea, 1,3-dimethylol-1-methyl thiourea, 1,3-dimethylol-1,3-dimethyl urea, 1,3-dimethylol-1, 3-dibutyl urea, 1,3-dimethylol-1,3-diisobutyl thiourea, and 1-methylol-1,3,3-trimethyl urea.

The imidazolidines, also known as cyclic ureas, have the general formula:

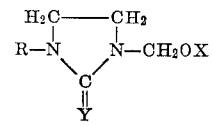

wherein Y is sulfur or oxygen, X is lower alkyl (1–8C) or hydrogen and R is lower alkyl (1–8C), hydrogen, or —$CH_2OX$. Examples of the N-(substituted oxymethyl) imidzolidines are 1,3-dimethylol-2-imidazolidinethione, 1,3-dimethylol-2-imidaolidinone, and 1-methylol-3-methyl-2-imidazolidinethione.

The hydantoins, also referred to as cyclic ureides, have the general formula:

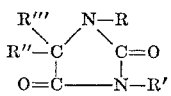

wherein R and R' are lower alkyl (1–8C), hydrogen and at least one being —CH₂OX wherein X is hydrogen or lower alkyl (1–8C) and R'' and R''' are lower alkyl (1–8C), or hydrogen. Examples of these hydantoins are 1-methylol-5,5-dimethyl hydantoin, 3-methylol-5,5-dimethylhydantoin, 1,3 - dimethylol-5,5-dimethylhydantoin, and 1-methylol-5,5-dibutylhydantoin.

The N-(substituted oxymethyl) melamine derivatives have the general formula:

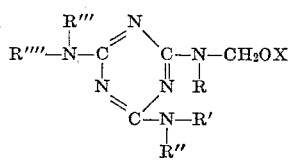

wherein X is hydrogen or lower alkyl (1–8C), R, R', R'', R''', and R'''' are lower alkyl (1–8C), hydrogen or CH₂OX wherein X is hydrogen or lower alkyl (1–8C). Examples of these melamines are hexakis (methoxymethyl) melamine, N, N', N''-trimethyl-N, N', N''-trimethylolmelamine, hexamethylolmelamine, N, N', N''-trimethylolmelamine, N-methylolmelamine, N, N'-dimethylolmelamine, N, N', N''-triethyl-N, N', N''-tris(methoxymethyl)melamine, and N, N', N''-tributyl-N, N', N''-trimethylolmelamine.

The N-methylol derivatives of urea are made by reacting the parent urea with 2 mole equivalents of a 37% aqueous formaldehyde solution until the urea has dissolved in the solution during stirring, removing water and recovering the product. The N-methylol derivatives of imidazolidine and of hydantoin are prepared in the same manner described for the urea above with the exception that the parent urea is substituted with the parent imidazolidine and with the parent hydantoin. The N-methylol melamines are prepared by reacting the parent or base melamine with from 1 mole equivalent to 6 mole equivalents of 37% aqueous formaldehyde solution with stirring until the melamine has completed its reaction with the formaldehyde as evidenced by solvation of the melamine. Water is removed and the desired product recovered in a conventional manner. A most important property exhibited by the methylene donors of this invention after they have reacted to form the resin in situ is the fact that the resulting products of the reaction do not degrade the polyester or the polycarbonate cord, particularly when the cord is embedded in the laminate then subjected to high temperatures for prolonged periods of time particularly under those conditions that prevail when the laminate is used in the construction of a pneumatic tire which runs at high speeds which in turn tends to generate large amounts of heat.

The polyester and polycarbonate fibers are of particular value in reinforcing rubber because of the quality of high strength possessed by these fibers even at high temperatures with little tendency to stretch as is the characteristic of other synthetic man-made fibers such as the polyamides. The polyester reinforcing fibrous structures are prepared from fiber-forming thermoplastic linear high molecular weight condensation polyester filaments and those polyesters made particularly from polyethylene terephthalate as well as polymers of cyclohexanedimethylene terephthalate. By linear terephthalate polyesters is meant a linear condensation polyester comprising recurring glycol dicarboxylate structural units in which at least about 85% of the recurring structural units are units of the formula

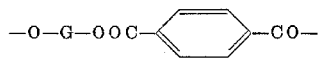

wherein G represents a divalent organic radical containing from about 2 to about 8 carbon atoms which is attached to the adjacent oxygen atoms by saturated carbon atoms. The terephthalate radical may be the sole dicarboxylate constituent of the recurring structural units or up to about 15% of the structural units may contain other dicarboxylate radicals such as adipate, sebacate, isophthalate; 4,4'-bibenzoate and hexahydroterephthalate. By high molecular weight is meant polyesters having an intrinsic viscosity of at least 0.4 and preferably 0.6 to 1.0 and as high as 1.5 as measured in a 60/40 phenol/tetrachlorethane mixed solvent at 30° C. Dacron T68 is an example of a commercially available polyester fiber which is a high melting, high molecular weight high tensile strength polyester, made of polyethylene terephthalate having an intrinsic viscosity of .85. In preparing the linear terephthalate polyester filaments useful in this invention and particularly best suited for reinforcing rubber through the formation of the in situ resins described herein, the filaments are preferred to have a free carboxyl group concentration of less than about 65 equivalents per million grams of polyester and preferably less than about 20 equivalents. It is preferred that the polyethylene terephthalate and other similar polyesters have a high melting point which for polyethylene terephthalate is about 265° C. measured with a hot stage polarizing microscope. Generally the polyester fibers of this invention may be prepared in accordance with well known procedures for melt extrusion and drafting.

The polycarbonate polymers useful in making reinforcing fibers are those having properties similar to those described for the polyesters above and more particularly described in U.S. Patents 3,035,020, 3,030,331, and 3,000,849. A specific fiber forming polycarbonate is one resulting from the reaction of phosgene and 4,4'-isopropylidenediphenol. Bisphenol C and Bisphenol G may also be reacted with phosgene to form a fiber forming polycarbonate. The polycarbonates may also be referred to as poly(diesters) of carbonic acid and glycols.

The rubber component of the laminate of this invention may be any rubber that is a stretchable composition having a tendency to return to its approximate original shape after being vulcanized and particularly any rubber that is used in the manufacture of tires, drive belts or pressure hose. Thus the laminate of this invention may involve natural rubber otherwise known as Hevea Brasilinesis, or conjugated diene polymeric rubbers made by polymerizing butadiene-1,3, isoprene, 2,3-dimethyl butadiene-1,3, and mixtures of these conjugated dienes as well as copolymers of these diene monomers with up to 50% of compounds which contain a CH₂:C:group and which are copolymerizable with butadiene-1,3 where for example at least one of the valences is attached to an electronegative radical, that is a radical which increases the polar character of the molecule such as vinyl, phenyl, nitrile and carboxy radicals. Examples of the diene rubbers are polybutadiene, stereospecific polybutadienes particularly those with a cis-1,4 content of at least 90%, polyisoprene, stereospecific polyisoprenes particularly those with a cis-1,4 content of at least 90%, butadiene/styrene copolymers, also known as SBR and butadiene/acrylonitrile copolymers also known as NBR.

The rubber being bonded to the reinforcing element in the presence of an in situ resin will contain conventional compounding and vulcanizing ingredients such as carbon black, anti-oxidants, sulphur, zinc oxide, accelerators, and rubber processing and softening oils which may be added as such or may be prepared from oil-extended rubbers.

The laminate of this invention is prepared by coating the rubber which has been compounded in accordance with the disclosure set forth above onto a fabric of reinforcing fibers in the usual manner by calendering a coating of the vulcanizable rubber composition onto both sides of the fabric as is the conventional manner for coating a tire cord fabric with the tire carcass stock. The reinforcing fabric may be used without any previous treatment and under these conditions the fabric is known as grey cord indicating that no treatment in the form of an adhesive composition has been applied to the surface of the cord.

The following example illustrates the best mode in which the invention may be performed. All parts are by weight unless otherwise identified.

EXAMPLE 1

The tire cord used in this example is made by first twisting 1100 denier yarn at the rate of 12 turns per inch and then twisting three of these singles at the rate of 12 turns per inch to form a cord. The yarn is made of polyethylene terephthalate filaments having a melting point of 260° C. and an intrinsic viscosity of 0.68.

The polyester cord is treated with rubber made and compounded in accordance with the following formula:

| Ingredients | Parts by weight | |
|---|---|---|
| | Amounts | Range |
| (1) Natural rubber | 65 | 0–100 |
| (2) OE/SBR (styrene/butadiene-1,3 25/75 copolymer) (plus 37½ parts oil per 100 SBR) | 48.13 | 100–0 |
| (3) Carbon black | 40 | 10–60 |
| (4) Zinc oxide | 4 | 2–10 |
| (5) Stearic acid | 2 | 1.5–3.0 |
| (6) Primary accelerator (2,2'-dithiobisbenzothiazole) | 1.25 | .5–3.0 |
| (7) Secondary accelerator (tetramethylthiuram disulfide) | .10 | .05–1.0 |
| (8) Sulphur | 2.5 | 1.0–5.0 |
| (9) Methylene acceptor (m-disubstituted benzene) | (¹) | 1–10 |
| (10) Methylene donor (=N—CH₂OX type compound) | (¹) | 1–10 |

¹ As noted.

In compounding the rubber stock in accordance with the formulation set forth above a master batch of ingredients 1 and 2 are made with the carbon black in a mill at a temperature of about 110° C. The resulting carbon black master batch is then cooled and the remaining compounds are added to the batch in the order indicated above in a Banbury at a temperature of about 70° C. The control rubber was prepared in a similar manner except that a methylene acceptor and a methylene donor was not added. The mole ratio of acceptor to donor may range from 1/1 to 1/6 per 100 parts of rubber and preferably in such ratio as to use up each resin forming component in forming the resin in situ.

The adhesion of the rubber compounds was measured at 250° F. by the hot "U" adhesion test after the cord was coated with the rubber compound under test and the assembly vulcanized for 15 minutes at 310° F. The pounds necessary to pull the adhered cord free from the rubber block is the hot "U" adhesion value. The following table shows the results that may be obtained in the practice of the present invention:

In the examples in the table above each of the methylene donors will produce an exceptional bond between the surface of the polyester, nylon and rayon cords and the rubber and the values shown are unexpected in view of the fact that no preliminary treatment with an adhesive composition was given to the cord prior to its embedment in the rubber. It has also been observed that the methylene donors react favorably in the rubber to improve the physical properties of the rubber such as the 300% modulus, the ultimate tensile strength, the elongation, the hot rebound, the hot deflection, dynamic modulus, and of equal importance, without degrading the physical properties of the cord being bonded to the rubber and in the case of polyester and polycarbonate cords to the rubber especially after heat aging.

It is believed that the methylene donor undergoes a reversible reaction in the presence of heat to produce methylene either as formaldehyde or as methylene radical which in turn is nascently reactable with the methylene acceptor to produce a resinous matrix throughout the body of the rubber while at the same time promoting desirable adhesion between the surface of the polyester cord and the rubber. In each instance the $CH_2$ group intermediate the oxygen and the nitrogen is the essential component which is generated under the heat of vulcanization to form the resinous matrix with the methylene acceptor.

By lower alkyl (1–8C) radicals is meant methyl, ethyl, propyl (n- and iso-), butyl (n-, sec-, iso-, and tert-), amyl (n-, sec-, iso-, and tert-), hexyl e.g. n-hexyl, sec-hexyl, 2,2-dimethyl-3-butyl, 2,2-dimethyl-4-butyl, 2,3-dimethyl-2-butyl, 2-methylpentyl, 2-methyl-2-pentyl, 3-methyl-1-pentyl, 3-methyl-2-pentyl, etc., heptyl, e.g. n-heptyl, sec-heptyl, 2,3-dimethyl-3-pentyl, 2,4-dimethyl-2-pentyl, 2,4-dimethyl-3-pentyl, 2,2,3-trimethyl-3-butyl, 3-ethyl-2-pentyl, 2-methyl-2-hexyl, etc., octyl, e.g. n-octyl, 2-ethylhexyl, and 2,2,4,4-tetramethylbutyl.

Each of the methylene donors described above will form a resin in situ in the rubber when reacted with any one or combination of the following methylene acceptors; resorcinol, m-aminophenol, resorcinol monoacetate, resorcinol diacetate and other m-disubstituted benzenes wherein the substituents may be hydroxyl (—OH), amino (—NH₂) or acetoxy (OCOCH₃) radicals; as well as 1,5 naphthalenediol, phenol, alpha and beta naphthol resins resulting from the partial reaction of the foregoing acceptors with formaldehyde. Other acceptors include o-disubstituted benzenes such as o-aminophenol, melamine and the partial reaction products of dicarboxylic acids such as phthalic, isophthalic and terephthalic acids, with phenols such as phenol, resorcinol, o-aminophenol, and m-aminophenol, and partial reaction products with urea, aniline, m-phenylenediamine and p-phenylenediamine. Adhesion to the grey cord may be further improved if the cord is previously treated with conventional cord adhesives by passing the cord through an adhesive dip of an aqueous dispersion of a mixture comprising a phenol, an aldehyde and a rubber latex. The mole ratio of acceptor to donor may range from 1/1 to 1/6 per 100 parts of rubber.

The rubber compositions containing the combination of methylene acceptors and donors of the type disclosed

TABLE I

[Grey cord as indicated embedded in rubber and vulcanized at 310° F. for 15 minutes for polyester and rayon and vulcanized at 275° F. for 80 minutes for nylon]

| Examples | Acceptor | Parts per 100 parts | Donors | Parts per 100 parts | Hot "U" adhesion pounds | | |
|---|---|---|---|---|---|---|---|
| | | | | | Nylon | Polyester | Rayon |
| C | None | None | None | 0 | 3.2–4.4 | 1.6–1.8 | 1.8–2.1 |
| 3 | Res | 1.10 | MIZO | 1.80 | 7.3–8.2 | 6.6–7.3 | 7.4–8.5 |
| 4 | Res | 1.10 | DMIT | 1.80 | 6.3–7.5 | 3.1–4.2 | 3.0–4.1 |
| 5 | Res | 1.10 | HKMM | 1.80 | 13.7–15.2 | 9.9–12.1 | 19.0–23.0 |
| 6 | MAP | 1.10 | MIZO | 1.80 | 7.5–8.4 | 4.6–5.8 | 2.4–3.6 |
| 7 | MAP | 1.10 | DMIT | 1.80 | 7.0–8.1 | 4.2–5.4 | 3.0–4.2 |
| 8 | MAP | 1.10 | HKMM | 1.80 | 11.1–12.6 | 5.1–6.9 | 9.0–11.2 |

MIZO—1,3-dimethylol-2-imidazolidinone. DMIT—1,3-dimethylol-2-imidazolidinethione. HKMM—Hexakis (methoxymethyl) melamine. Res—Resorcinol. MAP—m-aminophenol. C—Control.

herein are particularly useful in the manufacture of pneumatic tires, pressure hose, and drive belts, wherein the rubber is subjected to severe forces to the extent that the rubber must be reinforced with a rubber reinforcing agent and the instant invention permits the use of polyester reinforcing agents which possess physical properties far superior to other reinforcing agents, particularly of the rayon and nylon type.

While certain representative embodiments and details have been shown for the purpose of illustrating the invention, it will be apparent to those skilled in this art that various changes and modifications may be made therein without departing from the spirit or scope of the invention.

What is claimed is:

1. In a rubber structure comprising rubber reinforced with a non-metallic reinforcing element, the improvement comprising adding to the rubber being reinforced a methylene donor and a methylene acceptor capable of reacting with the methylene donor, the donor being 1,3-dimethylol-2-imidazolidinethione.

2. In the rubber structure of claim 1 wherein the donor is 1,3-dimethylol-2-imidazolidinone.

References Cited

UNITED STATES PATENTS

| 2,975,095 | 3/1961 | Bletso. |
| 3,018,207 | 1/1962 | Danielson. |
| 3,097,109 | 7/1963 | Danielson. |
| 3,097,111 | 7/1963 | Danielson. |
| 3,194,294 | 7/1965 | Van Gils. |
| 3,212,955 | 10/1965 | Kaizerman. |

OTHER REFERENCES

Schildknecht, C. E.: "Polymer Processes," Interscience Pub. Inc., New York City, Feb. 28, 1956, pp. 338, 339.

JOHN T. GOOLKASIAN, Primary Examiner

C. B. COSBY, Assistant Examiner

U.S. Cl. X.R.

117—162; 156—110, 331, 335, 338; 161—260; 260—67.5, 840